Nov. 14, 1967  A. DI SETTEMBRINI  3,352,404
DEVICES FOR STABILIZING LIGHT OBJECTS ON CONVEYOR BELTS
Filed Dec. 16, 1966
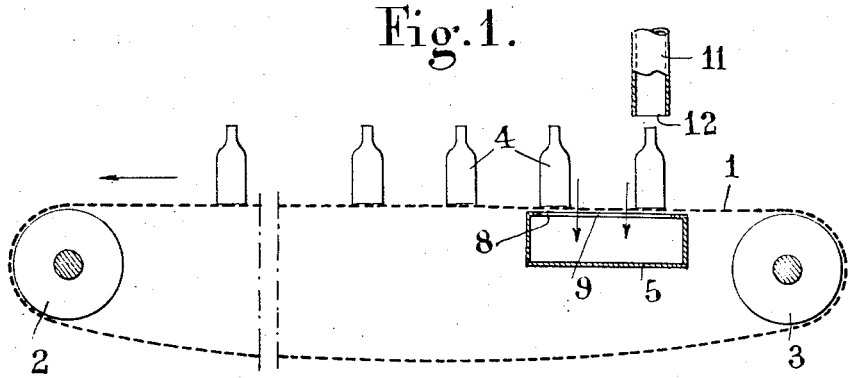
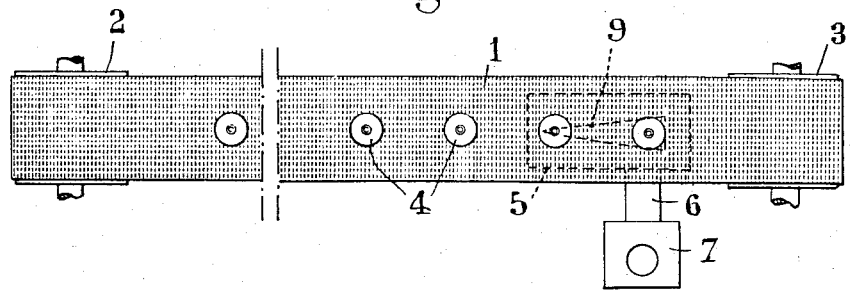
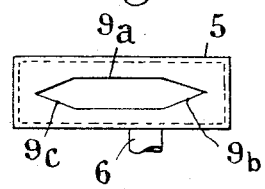
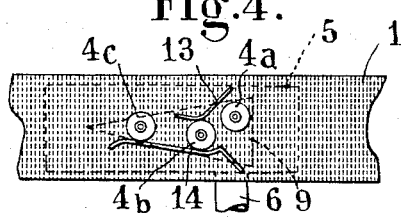

United States Patent Office 3,352,404
Patented Nov. 14, 1967

3,352,404
DEVICES FOR STABILIZING LIGHT OBJECTS
ON CONVEYOR BELTS
Antoine Di Settembrini, Moulin de la Drille,
Epouville, France
Filed Dec. 16, 1966, Ser. No. 602,233
Claims priority, application France, Dec. 20, 1965,
42,948, Patent 1,470,334
1 Claim. (Cl. 198—52)

ABSTRACT OF THE DISCLOSURE

A device for placing in a stable position light objects, notably plastic bottles, on a movable air-pervious conveyor belt, comprising a suction box disposed beneath said conveyor belt and having an upper face, means for creating a suction in said box, an opening formed in said upper face of the suction box which is adjacent to said conveyor belt, said opening having the shape of an elongated isosceles triangle with the vertex in the direction of travel of said conveyor belt, characterized in that delivery means are adapted to drop the objects vertically upon said conveyor belt above said suction box opening in the area corresponding to the minor base of said triangular opening, that is in the zone of said opening where the strongest suction is produced.

---

This invention relates to devices for placing or maintaining in a stable position light objects, notably plastic bottles, on a conveyor belt.

It is already known to provide a conveyor comprising an air pervious belt and means for creating a suction through the upper span of the conveyor belt in order to hold an object in a stable position during its transport on this conveyor belt. The conveyor is equipped with suction means for holding objects in a stable position which comprises a suction box disposed beneath the upper span of the conveyor belt. The upper face of this suction box which is positioned just beneath the upper span of the conveyor belt consists of a plate perforated throughout its length.

The objects travelling on the conveyor belt are thus urged against the upper surface of the belt nearly throughout the length of the upper span of this belt, that is, to the point of ejection of the objects. Now when it is desired to transport plastic bottles to be kept in a well-defined vertical position and to be subjected to subsequent operations such as the filling with a liquid, it is very frequently necessary that the bottles, after having been properly positioned on the conveyor belt, be left free thereon. The hitherto known suction-type holding conveyor cannot provide this result for the objects are constantly urged against the belt throughout their travel.

The present invention permits of avoiding this drawback by providing a novel and particularly simple arrangement.

It is the essential object of this invention to provide a device capable of placing or maintaining in a stable position objects, notably plastic bottles, on an air-pervious conveyor belt, this device comprising a suction box disposed beneath the conveyor belt and means for creating a suction in said box, this device being characterised in that the upper face of the suction box, which is adjacent to the upper span of the conveyor belt, has formed therein a single elongated opening having its longer dimension parallel to the direction of motion of the conveyor belt, the length of said opening being equal to the distance along which the objects are to be held in their stable position on the conveyor belt.

The opening formed in the upper face of the suction box may be rectangular or preferably triangular.

In this last case, the transverse dimension of the opening decreases gradually in the direction of travel of the conveyor belt and involves a corresponding decrease in the stabilizing action exerted by the suction on the objects as these are conveyed above the opening of said suction box.

The device according to this invention lends itself to various applications, such as: the distribution of light articles, such as plastic containers fed by pneumatic transfer means, on a conveyor belt; holding these articles in a stable position on said conveyor belt along a predetermined length thereof; the accurate positioning of an object in the transverse direction and the maintaining of objects in a stable position on the conveyor belt, or along a predetermined inclined section of this conveyor belt. As a rule, the device of this invention is applicable whenever it is desired to keep light objects in stable and accurate positions on a conveyor belt.

In order to afford a clearer understanding of this invention and of the manner in which the same may be carried out in practice, reference will now be made to the attached drawing illustrating diagrammatically by way of example a typical form of embodiment of the device constituting the subject-matter thereof. In the drawing:

FIGURE 1 is a diagrammatic vertical section showing a conveyor belt on which plastic bottles are positioned by the device of this invention;

FIGURE 2 is a plane view of the same arrangement;

FIGURE 3 is a fragmentary plane view showing an alternate form of embodiment of the suction box, and FIGURE 4 is a fragmentary plane view of the positioning device.

Referring firstly to FIGURES 1 and 2 of the drawing, the device comprises a conveyor belt 1 driven by wheels or cylinders 2 and 3; this conveyor belt 1 is air pervious and may consist for example of wire gauze or of a regularly perforated plastic band, the perforations being formed at least on the width receiving the objects to be transported. The conveyor belt 1 may also consist of a chain of which the links are perforated plates or blades.

In the specific form of embodiment illustrated in the drawing the objects to be transported consist of plastic bottles 4. The device according to this invention for maintaining bottles or like articles in a stable position on the conveyor belt 1 comprises essentially a suction box 5 disposed beneath the upper span of conveyor belt 1 and connected through a pipe 6 to the suction side of a fan 7. The suction box 5 is secured to the frame of the conveyor belt in such a manner that its upper face 8 is in light frictional contact with, or at least very closely adjacent to, the underface of conveyor belt 1, so that an efficient suction be exerted through the belt. The upper face 8 of suction box 5 has an opening 9 formed therethrough which in the form of embodiment illustrated in FIGURES 1 and 2 of the drawing has the shape of an isosceles triangle with the vertex disposed in the direction of movement of the conveyor belt 1.

The apparatus according to this invention may be used, as shown in the drawing, for conveying on the belt 1 bottles 4 delivered by the pipe 11 of a pneumatic feeding device (not shown). This pipe 11 has its outlet disposed vertically above the belt so that the bottles 4 fall directly upon the belt 1. The pipe 11 is so disposed with respect to the triangular opening 9 that the bottles 4 fall upon the belt 1 in the area corresponding to the minor base of the triangular opening 9 where the suction has its maximum efficiency. The lower end 12 of the pneumatic pipe 11 is so spaced from the belt 1 that the bottles 4 can pass freely under the pneumatic pipe 11.

When a bottle 4 is delivered by the pneumatic pipe 11 it is attracted by the air current created through the opening 9 of suction box 8 and is thus maintained in its upright position on the belt 1 as a consequence of the dynamic action of the air stream. Obviously, this is not a static suction.

The belt 1 travelling in the direction of the arrow, FIGURE 1, carries along the bottle 4 so that the latter gradually emerges from the active zone of the air stream due to the particular configuration of the suction opening 9. The stabilizing effect exerted on the bottle 4 will thus decrease as the bottle is carried along by the belt 1 until it ceases completely when the bottle 4 leaves the vertex end of opening 9.

The triangular shape of opening 9 should not be construed as limiting this invention. In certain cases, if a relatively moderate air current is sufficient for properly stabilizing the bottle 4, a rectangular opening 9 may be provided if desired. However, this rectangular shape is not adequate if the air current is rather strong for in this case the bottle 4 might tilt backwards when leaving the zone where the air current is effective. For this reason, the triangular configuration of opening 9 appears to be more advantageous.

The pneumatic transfer device 11 may comprise a pneumatic or electrical system for distributing the bottles 4 at spaced intervals.

The apparatus according to this invention may also be used for stabilizing bottles 4 outside the zone of pneumatic delivery of these bottles. This stabilization may be obtained for example along a given section of the conveyor belt, where it is desired to carry out an operation on stable bottles.

In this case, the opening formed in the upper face of suction box 5 may have the configuration shown in FIGURE 3. This opening has a rectangular central portion 9a having at either end an extension 9b and 9c in the form of an isosceles triangle. In this case, the vertical force exerted on the bottle increases gradually, then remains constant and finally decreases gradually. This opening may also have a lozenge configuration.

The apparatus according to this invention may also be used for accurately positioning bottles on a belt.

As shown in FIGURE 4, the bottles 4, delivered for example by a pneumatic transfer device through a pipe 11 as in the case illustrated in FIGURE 1, fall upon the belt 1 in the position shown at 4a, in the vicinity of the minor base of the triangular opening 9 formed in suction box 5. The bottle 4a is carried along by the belt 1 and abuts against a guide member 13 contacting the bottle very close to the belt surface. This guide member 13 rejects the bottle to another position 4b where it engages another guide member 14 acting like the guide member 13 and placing the bottle in its final transverse position, as shown at 4c, the bottle thus following a predetermined longitudinal path on the belt. Upon completion of this positioning operation the bottle leaves the zone where the air current is effective, unless it is desired to carry out an operation on the bottle while the latter is still subjected to the air current, for example a capsuling operation, a filling operation, etc. A vacuum corresponding to 300 centimeters of water will efficiently urge a bottle weighing up to 60 grams against the belt surface.

Of course, it will be readily understood by anybody conversant with the art that the specific forms of embodiment of the invention which are shown and illustrated herein are given by way of example only and should not be construed as limiting the scope of the invention since many modifications may be brought thereto without departing from the basic principle of the invention as set forth in the appended claim.

What I claim is:

A device for placing in a stable position light objects, notably plastic bottles, on a movable air-pervious conveyor belt, comprising a suction box disposed beneath said conveyor belt and having an upper face, means for creating a suction in said box, and an opening formed in said upper face of the suction box which is adjacent to said conveyor belt, said opening having the shape of an elongated isosceles triangle with the vertex in the direction of travel of said conveyor belt, and delivery means adapted to drop the objects vertically upon said conveyor belt above said suction box opening in the area corresponding to the minor base of said triangular opening, that is in the zone of said opening where the strongest suction is produced.

References Cited

UNITED STATES PATENTS

| | | | |
|---|---|---|---|
| 1,990,549 | 2/1935 | Kimball | 198—32 X |
| 3,022,912 | 2/1962 | Vincent | 198—179 X |
| 3,066,812 | 12/1962 | Stadelman | 198—179 X |
| 3,131,929 | 5/1964 | Rehm | 198—108 X |
| 3,291,282 | 12/1966 | Pedagno | 214—1 X |

HUGO O. SCHULZ, *Primary Examiner.*

EVON C. BLUNK, R. J. HICKEY, *Examiners.*